United States Patent
Ge et al.

(10) Patent No.: US 7,927,730 B2
(45) Date of Patent: Apr. 19, 2011

(54) BATTERY COVER LATCHING ASSEMBLY FOR PORTABLE ELECTRONIC DEVICE

(75) Inventors: Peng-Jin Ge, Shenzhen (CN); Rui-Hao Chen, Shenzhen (CN); Chia-Hua Chen, Tu-Cheng (TW); Hsiao-Hua Tu, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1092 days.

(21) Appl. No.: 11/325,110

(22) Filed: Jan. 5, 2006

(65) Prior Publication Data
US 2006/0154136 A1    Jul. 13, 2006

(30) Foreign Application Priority Data
Jan. 7, 2005    (CN) .................... 2005 2 0053631 U (51) Int. Cl.
*H01M 2/10*    (2006.01)
(52) U.S. Cl. ........................................... 429/97
(58) Field of Classification Search ............ 429/96–100, 429/122–255; 411/349–553
See application file for complete search history.

(56) References Cited

U.S. PATENT DOCUMENTS

| 2,281,443 | A | * | 4/1942 | Jones ............................ 411/550 |
| 5,051,049 | A | * | 9/1991 | Wills ............................ 411/258 |
| 5,620,291 | A | * | 4/1997 | Hayes et al. .................. 411/552 |
| 5,637,420 | A | * | 6/1997 | Jones et al. ................... 429/187 |
| 5,955,700 | A | * | 9/1999 | Slipy et al. .................... 174/50 |
| 6,267,543 | B1 | * | 7/2001 | David et al. ................... 411/552 |
| 6,730,432 | B1 | * | 5/2004 | Grosfeld et al. ............... 429/97 |
| 6,844,845 | B1 | * | 1/2005 | Whiteside et al. .......... 342/357.1 |

* cited by examiner

*Primary Examiner* — Basia Ridley
*Assistant Examiner* — Jacob Buchanan
(74) *Attorney, Agent, or Firm* — Jeffrey T. Knapp (57) ABSTRACT

A battery cover latching assembly is for use in a portable electronic device. The battery cover latching assembly includes a battery cover (10), a housing (40) and a locking member (20). The battery cover has a hook (122) formed on end thereof and a receiving hole (116) defined adjacent the hook. The housing has a catching portion formed on one end thereof. The locking member has an operating portion (22) and a cylindrical post (24) extending from one side of the operating portion. A latching portion (244) extends radially from the post and adjoins the operating portion. The operating portion is received the receiving hole of the battery cover. The post of the locking member is rotatably engaged with the catching portion of the housing. The latching portion of the locking member is releasably locked with the hook of the battery cover.

16 Claims, 6 Drawing Sheets

BATTERY COVER LATCHING ASSEMBLY FOR PORTABLE ELECTRONIC DEVICE

BACKGROUND OF THE INVENTION

1. Field of the Invention

The present invention generally relates to battery cover latching assemblies and, more particularly, to a battery cover latching assembly for use in a portable electronic device.

2. Discussion of the Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, e.g., the batteries are damaged or dead (i.e., no longer rechargeable).

A clasp structure or latch structure is used with a conventional battery cover to engage with a housing of a portable electronic device. For example, a mobile phone marked Alcatel OT310 has a latch for the battery cover. The latch includes a pair of hooks at one end of the battery cover and a locking pin protruding from the other end of the battery cover. Accordingly, a pair of grooves is defined in an end portion of a backside of a housing of the mobile phone, and a locking hole is defined in the other end portion of the backside of the housing. In assembly, the hooks are firstly inserted into the grooves in the backside of the housing. Then, the battery cover is pressed downwardly to the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm, too. However, during disassembly, a relative great effort is needed to disassemble the battery cover, since a substantial force is exerted thereon. Therefore, the battery cover is susceptible to damage during such disassembly As a result, it is inconvenient for a user to replace a battery in the housing of the mobile phone.

Therefore, a new battery cover latching assembly is desired in order to overcome the above-described shortcomings.

SUMMARY OF THE INVENTION

A battery cover latching assembly for a portable electronic device is provided, which is convenient for a user to operate and which is durable.

In one embodiment thereof, a battery cover latching assembly, configured for use in a portable electronic device, includes a battery cover, a housing, and a lock member. The battery cover has a hook formed on end thereof, and a receiving hole defined adjacent the hook. The housing has a catching portion formed on one end thereof. The locking member has an operating portion, and a cylindrical post extending from one side of the operating portion. A latching portion extends transversely from the cylindrical post and adjoins the operating portion. The operating portion is received the receiving hole of the battery cover. The cylindrical post of the locking member is rotatably engaged with the catching portion of the housing. The latching portion is releasably locked with the hook of the battery cover.

Other advantages and novel features will become more apparent from the following detailed description, when taken in conjunction with the accompanying drawings.

BRIEF DESCRIPTION OF THE DRAWINGS

Many aspects of the battery cover latching assembly can be better understood with reference to the following drawings. The components in the drawings are not necessarily to scale, the emphasis instead being placed upon clearly illustrating the principles of the present battery cover latching assembly. Moreover, in the drawings, like reference numerals designate corresponding parts throughout the several views.

DETAILED DESCRIPTION OF THE EMBODIMENTS

The present invention is suitable for portable electronic devices, such as mobile phones, PDAs, and so on.

Figure 1:
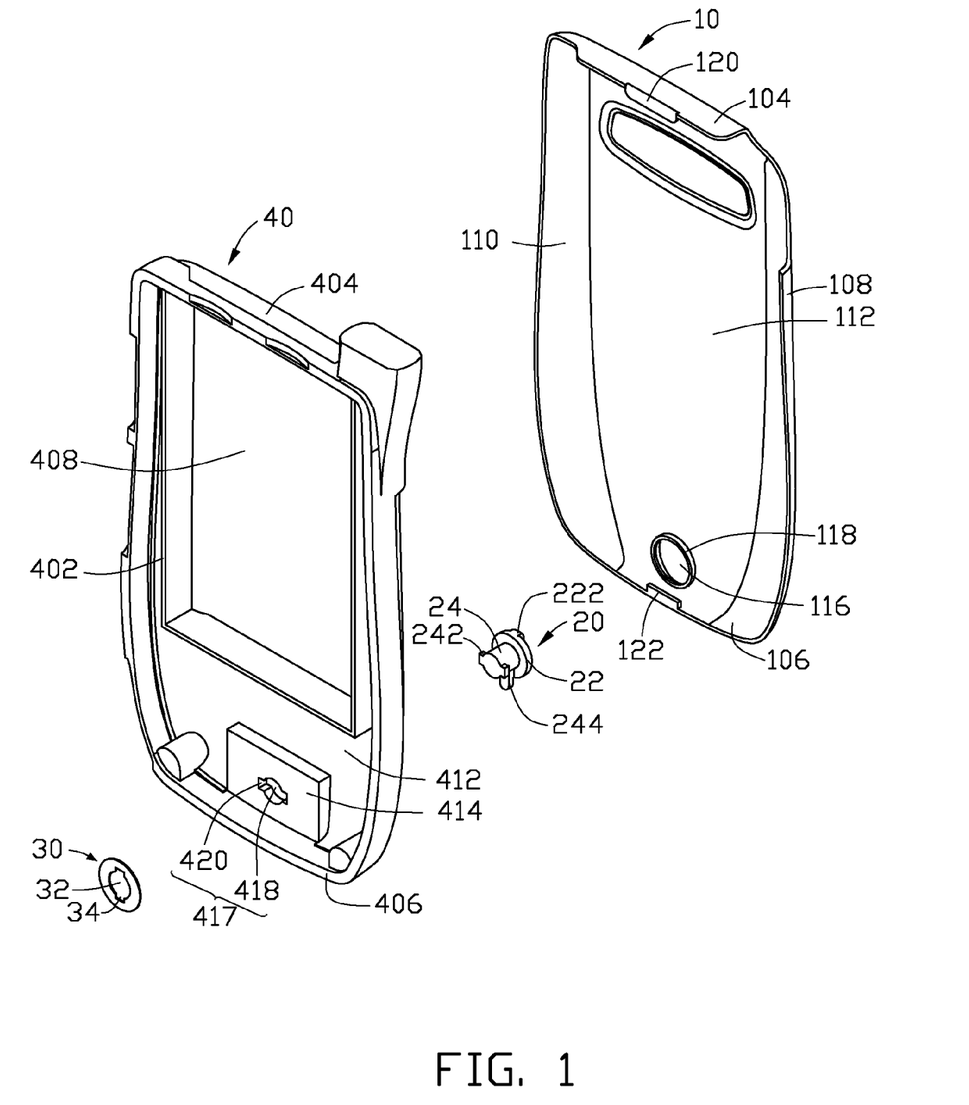
FIG. 1 is an exploded, isometric view of a mobile phone incorporating a battery cover latching assembly, in accordance with a preferred embodiment.
Figure 2:
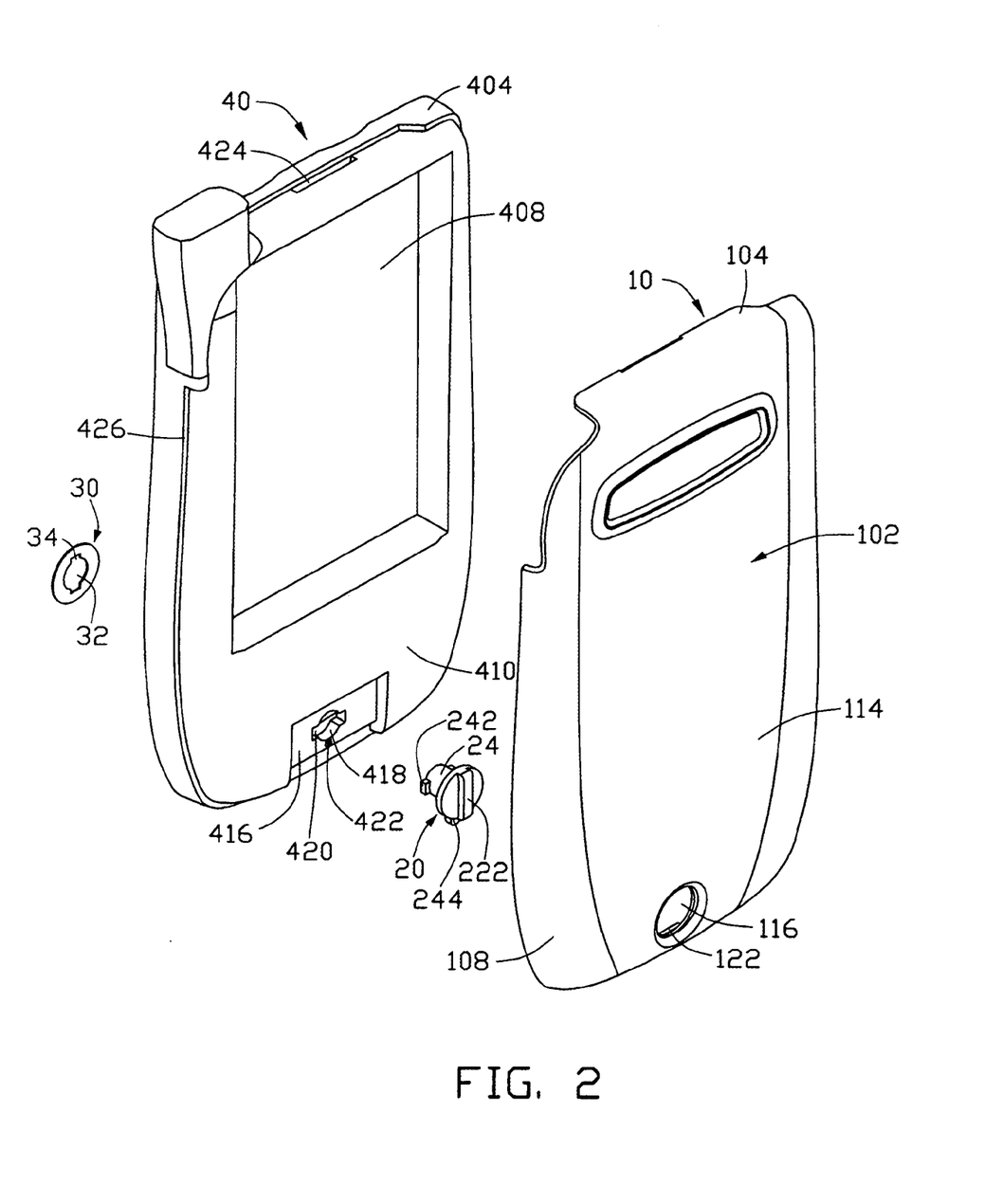
FIG. 2 is similar to FIG. 1, but viewed from another aspect.
Figure 7:
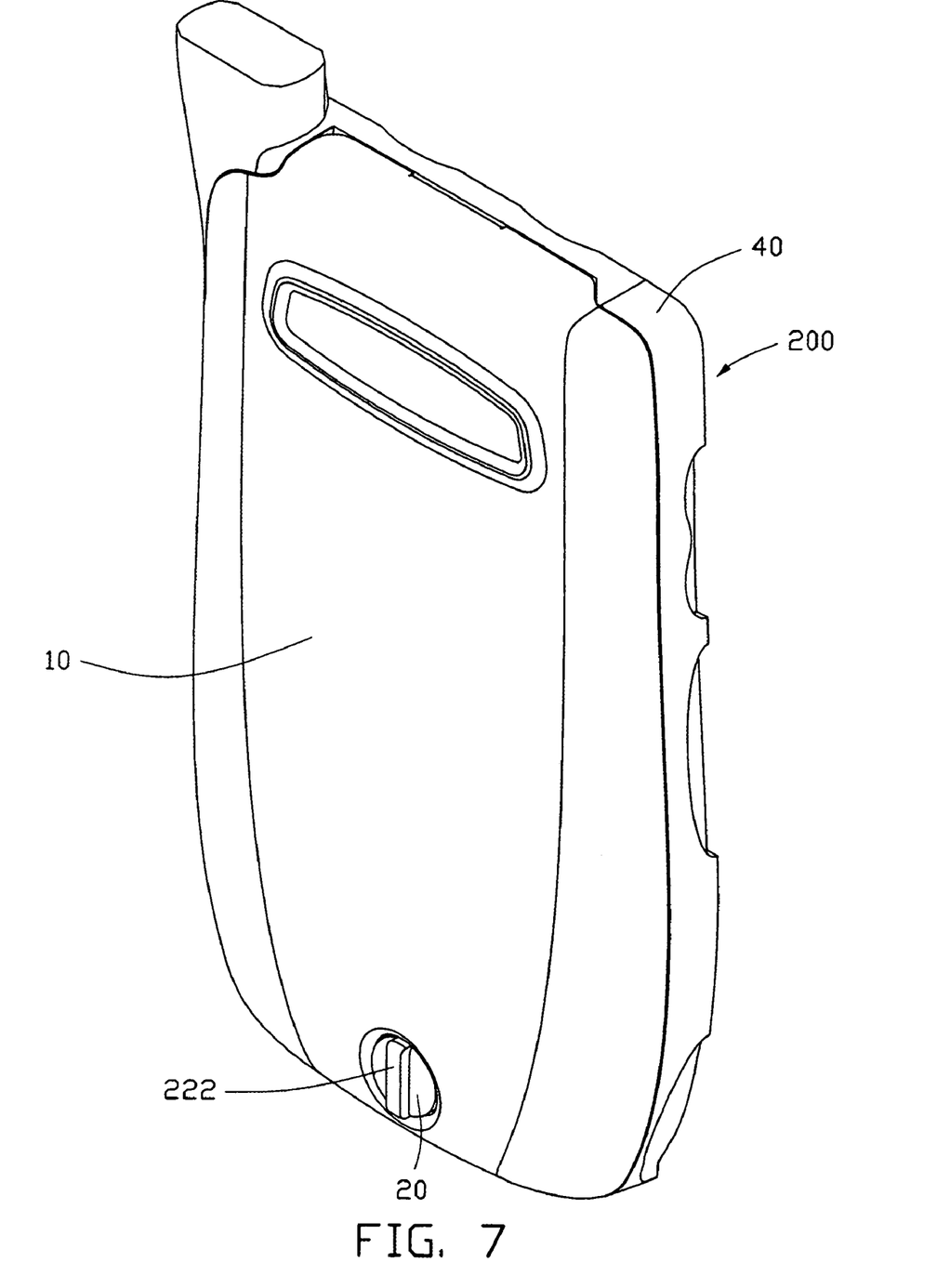
FIG. 7 is an assembled, isometric view of the mobile phone shown in FIG. 1, but viewed from another aspect.

Referring now to the drawings in detail, FIG. 1 and FIG. 2 show a battery cover latching assembly 100 (best seen in FIG. 5) incorporated in a mobile phone/portable electronic device 200 (best seen in FIG. 7). The mobile phone 200 is taken here as an exemplary application, for the purposes of describing details of a battery cover latching assembly 100 of the preferred embodiment. The mobile phone 200 includes a battery cover 10 and a housing 40. The battery cover latching assembly 100 includes a receiving hole 116 defined in the battery cover 10, a hook 122 as a fastening means formed on the battery cover 10, a catching portion 417 formed on the housing 40, and a locking mechanism 300 (best seen in FIG. 5). The locking mechanism 300 includes a locking member 20 and a washer 30. The locking mechanism 300 is rotatably locked on the housing 40. Accordingly, the battery cover 10 is engaged with the housing 40 of the mobile phone by means of the locking mechanism 300.

The battery cover 10 includes a main body 102, a top wall 104, a bottom wall 106, a left sidewall 108, and a right sidewall 110. The main body 102 includes an inner surface 112, which together with the top wall 104, the bottom wall 106, the left sidewall 108 and the right sidewall 110 defines a substantially rectangular space (not labeled) for receiving a battery. The main body 102 includes an outer surface 114 opposite to the inner surface 112. The receiving hole 116 is defined in a middle bottom portion of the main body 102, near the bottom wall 106. An annular projection 118 protrudes from the inner surface 112 of battery cover 10 around the receiving hole 116. A latch 120 briefly extends from a distal end of the top wall 104 toward the bottom end 106. As such, the latch 120 is configured for catching/latching in the housing 40, as seen from FIGS. 1, 2, and 5. Similarly, a hook 122, as a fastening means, extends briefly from distal end of the bottom wall 106 toward the top end 104, as best shown in FIGS. 1 and 6. As can be seen the hook 122 is proximate/ adjacent to the receiving hole 116. The hook 122 facilitates the fastening/locking of the locking member 20, relative to the battery cover 10.

Figure 3:
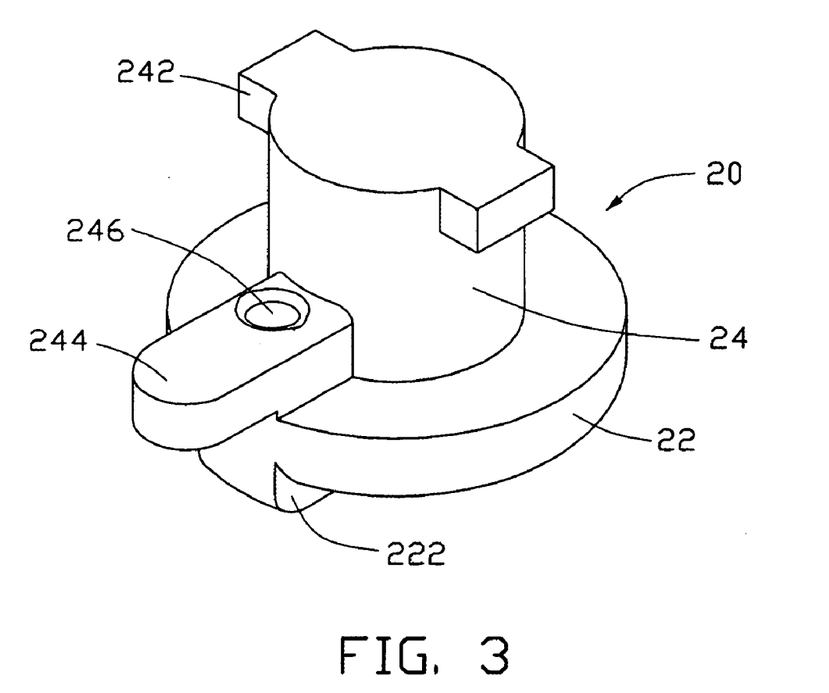
FIG. 3 is an enlarged, isometric view of a locking member of the battery cover latching assembly shown in FIG. 1.

Referring to FIG. 3, the locking member 20 includes a circular flange portion 22 as an operating portion and a cylindrical post 24 protruding from a center of one side of the flange portion 22. Two latching tabs 242 extend transversely from the distal end of the cylindrical post 24, opposite to the flange portion 22. These two latching tabs 242 are diametrically opposed to one another. A latching portion 244 extends perpendicularly/radially from the outer peripheral wall of the post 24 and adjoins the flange portion 22. The latching portion 244 extends in a manner so as to be perpendicular to each of the latching tabs 242. The latching portion 244 further has a circular groove 246 therein, facing in the same direction as the distal end carrying the latching tabs 242. A protrusion 222 is located on the other side of the flange portion 22 (i.e., the side opposite that carrying the latching portion 244). The protrusion 222 extends along the diametric direction and is configured for facilitating the operation (i.e., the turning) of the locking member 20.

Figure 4:
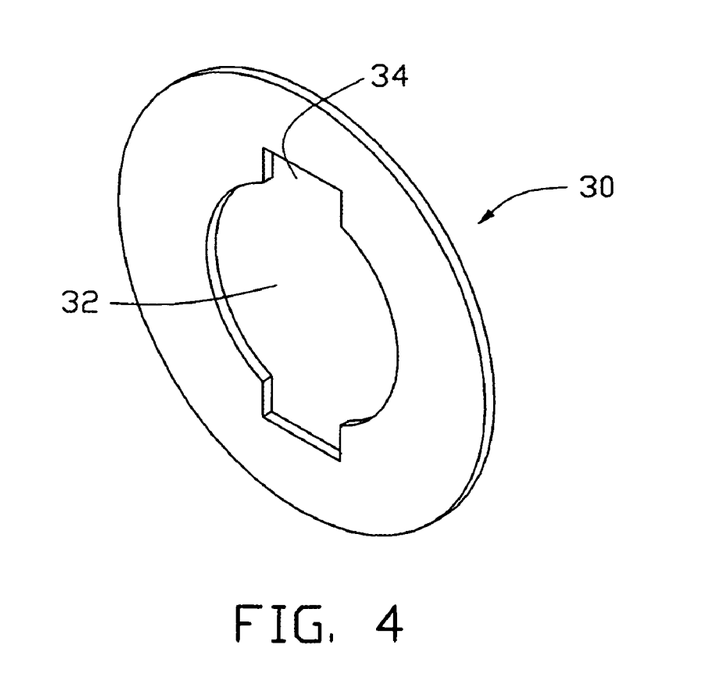
FIG. 4 is an enlarged, isometric view of a washer of the battery cover latching assembly shown in FIG. 1

Referring to FIG. 4, the washer 30 is a circular thin sheet and has a center hole 32 therein. Two opposite rectangular openings 34 are defined in the washer 30, and are in communication with the center hole 32. The shape and size of the two opposite rectangular openings 34 correspond to the latching tabs 242 of the locking member 20, thereby permitting a clearance fit therebetween and to thus allow detachable engagement of the locking member 20 with the washer 30. After being initially positioned to allow the locking member 20 to be received therethrough as well as through the battery cover 10, the washer 30 is then rotated so as to prevent the locking member 20 from disengaging with the battery cover (most beneficially, about 90°). At this point, the washer 30 is then advantageously attached to the battery cover 10 via an adhesive (e.g., glue) or some mechanical means or, alternatively, is integrally molded therewith. The thickness of the washer 30 is such that the rotation of the locking member 20 to allow engagement of the two opposite rectangular openings 34 and the corresponding latching tabs 242 of the locking member 20 will, in turn, permit the disengagement of the battery cover 10 from the housing 40.

Figure 5:
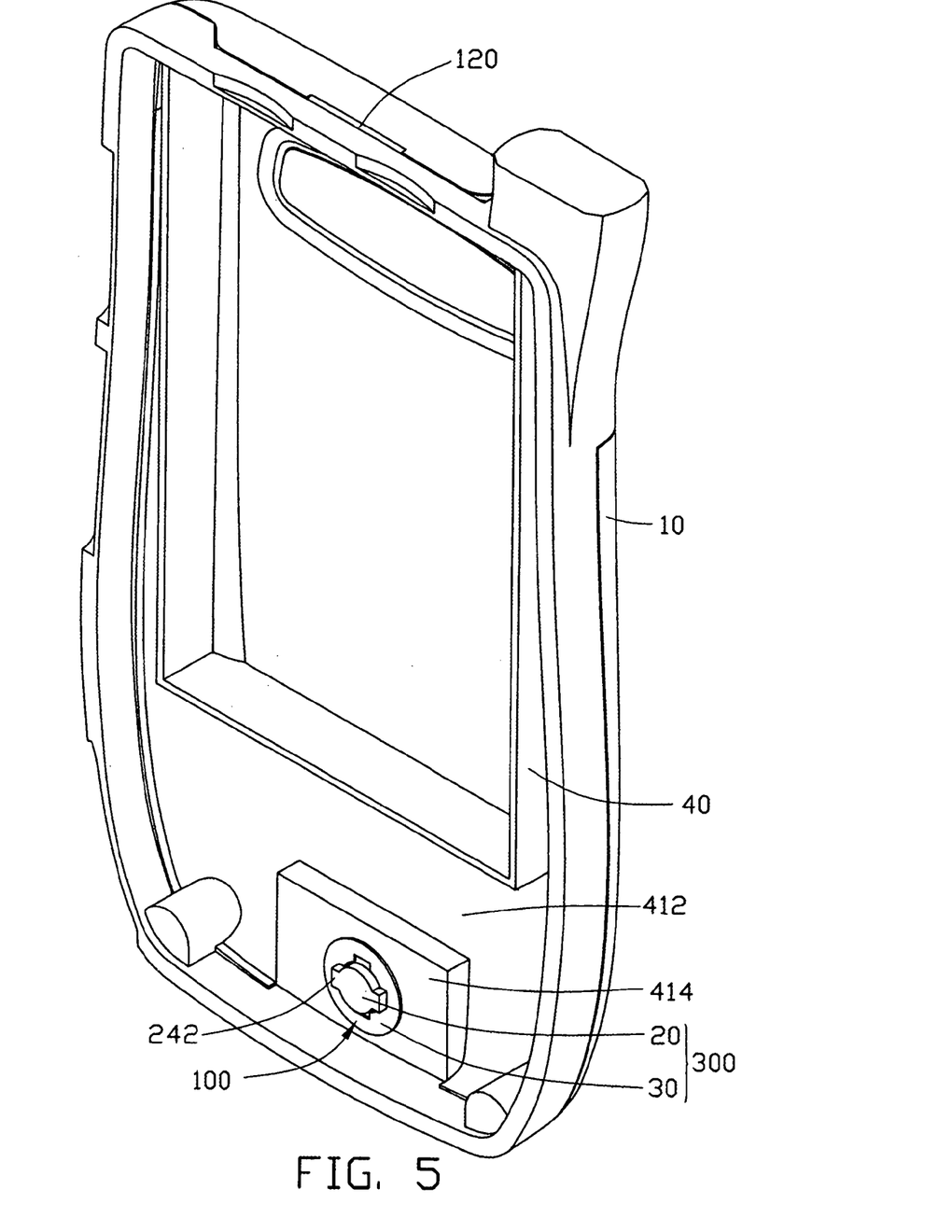
FIG. 5 is an assembled, isometric view of the mobile phone shown in FIG. 1.
Figure 6:
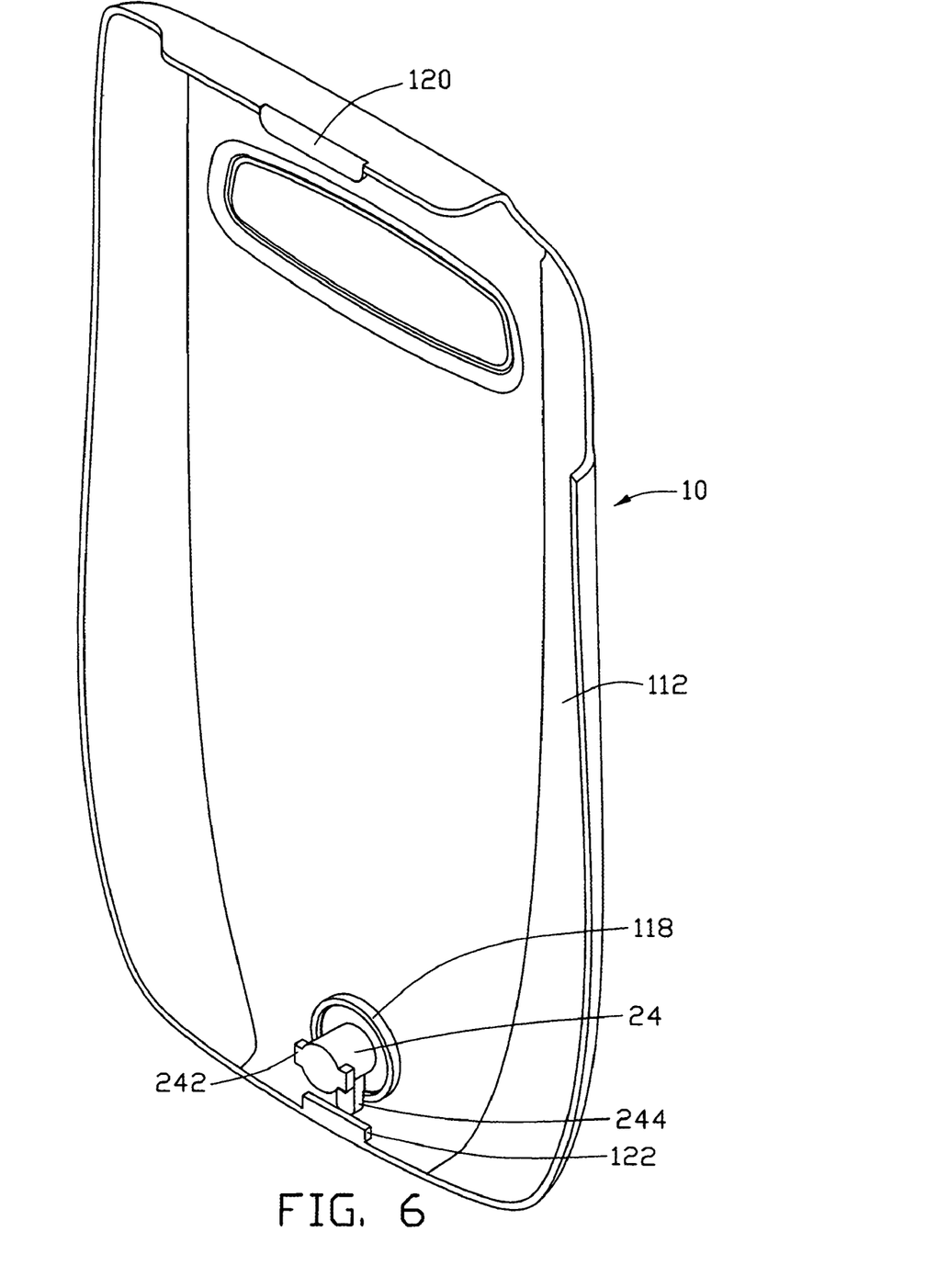
FIG. 6 is an schematic view of the battery cover and the locking member of the battery cover latching assembly shown in FIG. 5.

Referring to FIGS. 1, 2 and 5, the housing 40 is a portion of the mobile phone 200 for accommodating an electronic device, such as a printed circuit board (not shown), therein. This accommodation is achieved when the housing 40 is assembled with other housings of the mobile phone. The housing 40 includes a main body 402 with a top end 404 and a bottom end 406. The main body 402 defines a substantially rectangular cavity 408 adjoining the top end 404. The cavity 408 is used to receive a battery. The main body 402 includes an outer surface 410, facing the battery cover 10, and an inner surface 412. A rectangular protrusion 414 extends from a middle bottom portion of the inner surface 412 of main body 402, near the bottom end 406. The rectangular protrusion 414 is, however, recessed from the outer surface 410 of the main body 402 to form a rectangular groove or recess 416 in the outer surface 410. The rectangular groove or recess 416 is thus able to accommodate the annular projection 118 associated with the battery cover 10. A catching hole 418 is defined in the center portion of the rectangular protrusion 414. Two diametrically opposite tab hole 420 are further defined in the rectangular protrusion 414, communicating with the catching hole 418. The tab holes 420 and the catching hole 418 define the catching portion 417, and are respectively, configured for engagingly receiving the latching tabs 242 and the cylindrical post 24 of the locking member 20. A raised dot 422 is formed on the bottom of the rectangular groove 416 and adjacent the catching hole 418, near the bottom end 406. The raised dot 422 is adapted for catching/latching with the circular groove 246 formed in the latching portion 244. The raised dot 422 advantageously has angled and/or arcuate edges (not shown) to promote the catching/latching step. The main body 402 defines a detent 424 in the top end 404 thereof. The detent 424 is structured and arranged to releasably receive the latch 120 of the battery cover 10. In addition, the main body 402 defines a peripheral recessed portion 426 of which profile corresponds to that of a peripheral edge of the battery cover, for matching the periphery edge of the battery cover 10.

In assembly, referring now to FIG. 5, firstly, the washer 30 is disposed on the rectangular protrusion 414 of the housing 40, with each rectangular opening 34 aligning with one respective tab hole 420 of the housing 40. Secondly, the post 24 of the locking member 20 is inserted into the catching hole 418 of the housing 40 and the center hole 32 of the washer 30, with each latching tab 242 of the locking member 20 passing through one respective tab hole 420 of the housing 40 and one respective rectangular opening 324 of the washer 30. Thirdly, the washer 30 is rotated about 90 degrees and pasted on or otherwise adhered to the rectangular protrusion 414 of the housing 40 by, e.g., glue or an epoxy so that the latching tabs 242 of the locking member 20 are deflected away from the surface of the rectangular protrusion 414, unless otherwise moved so as to again mate with the rectangular openings 34. The latching tabs 242 of the locking member 20 resist a first side of the washer 30. Thus, the locking member 20 is thus rotatably but permanently attached to the housing 40.

Next, referring also to FIGS. 6 and 7, fourthly, the battery cover 10 is attached to the combined housing 40 as follows. The locking member 20 is rotated about 90 degrees so that the latching tabs 242 are perpendicular to the hook 122 of the battery cover 10, and the latching portion 244 is parallel to the hook 122 of the battery cover 10. The latch 120 of the battery cover 10 is inserted into the detent 424 of the housing 40. Then, the battery cover 10 is pressed toward the housing 40, and the peripheral edges of the battery cover 10 match the peripheral recessed portion 426 of the housing 40. Concurrently, the flange portion 22 of the locking member 20 is received in the receiving hole 116 of the battery cover 10, leaving the protrusion 222 exposed out of the receiving hole 116 of the battery cover 10. Lastly, the locking member 20 is rotated about 90 degrees by operating the protrusion 222 of the locking member 20. Due to this rotation, the latching portion 244 of the locking member 20 snap-locks on the hook 122 of the battery cover 10. At this state, the raised dot 422 of the housing 40 engages in the circular groove 246 of the locking member 20. The battery cover 10 is thus removably attached on the housing 40. During the above process, it can be readily realized when the raised dot 422 of the housing 40 engages in the circular groove 246 of the locking member 20. Therefore, locking member 10 can be located at an optimum position, thereby permitting the battery cover 10 to be stably attached on the housing 40.

When the battery cover 10 is detached from the housing 40, the locking member 20 is rotated about 90 degrees so that the latching portion 244 of the locking member 20 deflects away (i.e., disengages) from the hook 122 of the battery cover 10. Then, the battery cover 10 is uplifted from the housing 40, and the flange portion 22 of the locking member 20 falls out of the receiving hole 116 of the battery cover 10. Finally, the battery cover 10 is pulled away from the housing 40 after a user unhooks the latch 120 of the battery cover 10 from the detent 424 of the housing 40.

In alternative embodiments, the washer 30 could be omitted. Also, the locations of the raised dot 422 and the circular groove 246 could be switched with one another and still provide an equivalent connection.

As described above, the preferred embodiment provides a battery cover latching assembly 100 for devices such as a mobile phone 200. When the locking member is rotated, the cover of the battery cover assembly can be easily detached. This configuration provides the user with convenient operation of the device. Also, when the battery cover 10 is attached to the housing 40, the latching portion 244 of the locking member 20 is snappingly locked with the hook 122 of the battery cover 10. Thus, the battery cover 10 can be stably attached on the housing 40.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
a battery cover having a hook formed at one end thereof;
a housing defining a catching hole;
a locking member having first and second ends, one end of the locking member rotatably but permanently attached in the catching hole of the housing and the other end of the locking member having a latching portion, wherein the latching portion of the locking member is releasably locked with the hook of the battery cover;
wherein the battery cover comprises a receiving hole defined therein and adjacent the hook, the locking member further comprises a cylindrical post and an operating portion, the cylindrical post extends from one side of the operating portion, the latching portion extends radially from the cylindrical post and adjoining the operating portion, the operating portion is received in the receiving hole of the battery cover; at least one latching tab radially extends from the outer peripheral wall of the post, opposite to the operating portion, the housing comprises a catching portion, the catching portion includes the catching hole and at least one tab hole, each tab hole radially communicating with the catching hole, the cylindrical post extending through the catching hole, with the at least one latching tab fitting through a corresponding tab hole.

2. The portable electronic device as claimed in claim 1, further comprising a washer, the washer having a center hole therein and at least one rectangular opening radially communicating with the center hole.

3. The portable electronic device as claimed in claim 2, wherein the cylindrical post is inserted through the central hole, with each latching tab being configured to fit through a corresponding rectangular opening, the washer being secured on the housing after receiving the at least one latching tab therethrough, the at least one latching tab resisting one side of the washer when locked relative to the battery cover.

4. The portable electronic device as claimed in claim 3, wherein the washer is secured on the housing by an adhesive.

5. The portable electronic device as claimed in claim 1, wherein the battery cover has a latch extending from another end thereof.

6. The portable electronic device as claimed in claim 5, wherein the housing has a detent defined in another end thereof, the latch of the battery cover being received in the detent.

7. The portable electronic device as claimed in claim 1, wherein the latching portion has a circular groove therein, the circular groove facing away from the operating portion of the locking member.

8. The portable electronic device as claimed in claim 7, wherein the housing has a raised dot formed thereon, the raised dot facing the battery cover and located proximate the catching hole, the raised dot being structured and arranged for engaging in the circular groove when the latching portion locks with the hook of the battery cover.

9. The portable electronic device as claimed in claim 1, wherein a protrusion is formed on another side of the operating portion, the other side being opposite the side of the operating portion having the cylindrical post extending therefrom, the protrusion facing out of the receiving hole of the battery cover, the protrusion being adapted to facilitate turning of the locking member for selectable locking thereof.

10. A battery cover latching assembly for use in a portable electronic device, the portable electronic device having a battery cover and a housing, the battery cover latching assembly comprising:
a fastening means extending from one end of the battery cover;
a locking mechanism comprising a locking member, a latching portion disposed adjacent to one end of the locking member, the other end of the locking member being rotatably but unreleasably attached to the housing;
wherein the latching portion is releasably locked with the fastening means of the battery cover, the battery cover comprises a receiving hole defined therein and adjacent the fastening means, the locking member further comprises a post and a flange portion, the cylindrical post extends from one side of the flange portion, the latching portion extends radially from the post and adjoining the flange portion, the flange portion is received in the receiving hole of the battery cove, at least one latching tab radially extends from the outer peripheral wall of the post, opposite to the flange portion, the housing comprising a catching portion, the catching portion includes a catching hole defined in the housing and at least one tab hole communicating with the catching hole, the post extending through the catching hole, with each latching tab being configured to fit through a corresponding tab hole.

11. The battery cover latching assembly as claimed in claim 10, further comprising a washer, the washer being configured so as to initially be able to receive the post and each latching tab therethrough, the washer being finally secured so as to prevent complete disengagement of the locking member from the housing.

12. A portable electronic device comprising:
a battery cover having a hook formed at one end thereof;
a housing defining a catching hole;
a locking member having first and second ends, one end of the locking member rotatably but permanently attached in the catching hole of the housing and the other end of the locking member having a latching portion, wherein, the latching portion of the locking member is releasably locked with the hook of the battery cover;
wherein the battery cover comprises a receiving hole defined therein and adjacent the hook, the locking member further comprises a cylindrical post and an operating portion, the cylindrical post extends from one side of the operating portion, the latching portion extends radially from the cylindrical post and adjoining the operating portion, the operating portion is received in the receiving hole of the battery cover; a protrusion is formed on another side of the operating portion, the other side being opposite the side of the operating portion having the cylindrical post extending therefrom, the protrusion facing out of the receiving hole of the battery cover, the protrusion being adapted to facilitate turning of the locking member for selectable locking thereof.

13. The portable electronic device as claimed in claim 12, wherein at least one latching tab radially extends from the outer peripheral wall of the post, opposite to the operating portion, the housing comprises a catching portion, the catching portion includes the catching hole and at least one tab hole, each tab hole radially communicating with the catching hole, the cylindrical post extending through the catching hole, with the at least one latching tab fitting through a corresponding tab hole.

14. The portable electronic device as claimed in claim 12, further comprising a washer, the washer having a center hole therein and at least one rectangular opening radially communicating with the center hole.

15. The portable electronic device as claimed in claim 14, wherein the cylindrical post is inserted through the central hole, with each latching tab being configured to fit through a corresponding rectangular opening, the washer being secured on the housing after receiving the at least one latching tab therethrough, the at least one latching tab resisting one side of the washer when locked relative to the battery cover.

16. The portable electronic device as claimed in claim 15, wherein the washer is secured on the housing by an adhesive.

* * * * *